E. E. HANS.
ATTACHMENT FOR GAS ENGINE CRANK CASES.
APPLICATION FILED APR. 5, 1910.

994,389.

Patented June 6, 1911.

WITNESSES
AM Walstrom
J A Byrnes

INVENTOR
EDMUND E. HANS
BY Paul & Paul
ATTORNEYS

UNITED STATES PATENT OFFICE.

EDMUND E. HANS, OF MINNEAPOLIS, MINNESOTA.

ATTACHMENT FOR GAS-ENGINE CRANK-CASES.

994,389.

Specification of Letters Patent.

Patented June 6, 1911.

Application filed April 5, 1910. Serial No. 553,665.

*To all whom it may concern:*

Be it known that I, EDMUND E. HANS, of Minneapolis, Hennepin county, Minnesota, have invented certain new and useful Improvements in Attachments for Gas-Engine Crank-Cases, of which the following is a specification.

My invention relates to attachments for gas engines and particularly to the crank cases thereof, and is designed as an improvement over the device illustrated in my pending application filed February 14, 1910, No. 543822.

The object of my present invention is to provide means by which a uniform supply of oil can be maintained at all times in the crank case of the engine. This supply in engines, using the splash method of lubrication, often varies and where a gravity feed is relied upon, the driver is often deceived and assumes that there is an ample supply of oil in the crank case, while, in fact, it may have become so low as to cause insufficient lubrication. With my present invention, I am able to maintain a constant supply in the crank case with little effort on the part of the driver, the level of the oil being positively indicated by the indicating device of my application before referred to.

The invention consists generally in a crank case, an indicating device therefor and an oil tank or reservoir having a pipe connection with said crank case and means for forcing the oil from the reservoir into the crank case to maintain the desired level therein.

Figure 1:
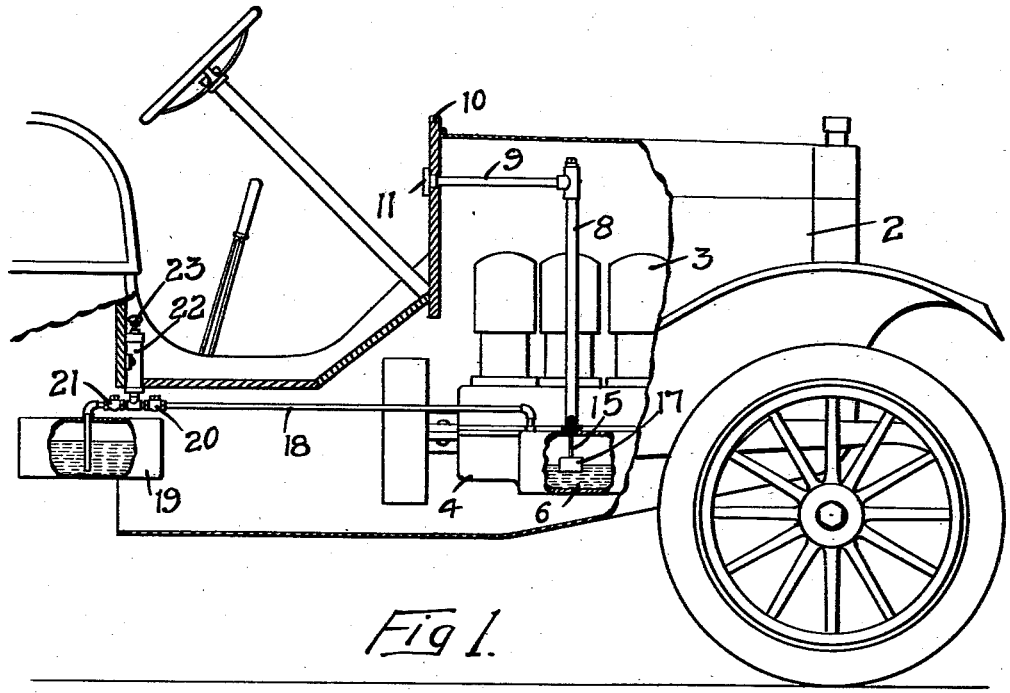
Figures 2, 3, 4, 5:
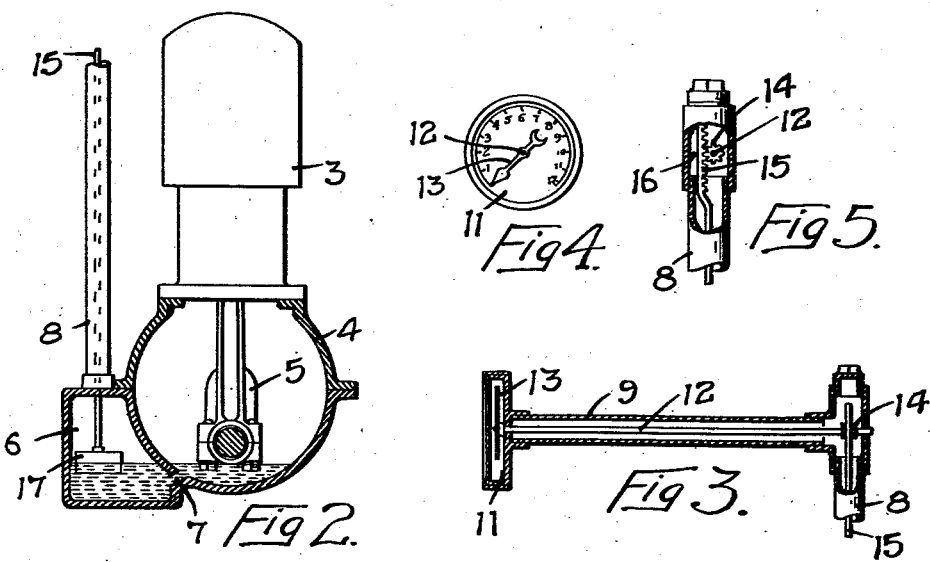

In the accompanying drawings forming part of this specification, Figure 1 is a side elevation partially in section of the forward portion of an automobile illustrating the application of my invention thereto. Fig. 2 is a detail sectional view transversely of the crank shaft and case. Fig. 3 is a detail sectional view showing the mechanism for transmitting the movement of the float in the crank case to the indicator hand. Fig. 4 is a front view of the indicator dial. Fig. 5 is a detail sectional view of the float movement transmitting mechanism.

In the drawing, 2 represents the forward portion of an automobile, 3 a gas engine mounted thereon provided with a crank case 4 and a crank shaft 5. The bottom of the crank case, as usual in engines of this type, forms a receptacle for lubricating oil, which is engaged by the revolving crank shaft and attachments and thrown thereby onto the working parts of the mechanism inclosed with the case. This is generally known as the splash form of lubrication. On one side of the crank case I provide a well or reservoir 6 formed integrally with the crank case or not as preferred, and connecting therewith through a port 7. A supply of oil in the well 6 flowing through the port 7 will seek its level in the bottom of the crank case. The bottom of this well is preferably below the bottom of the crank case and the well is adapted to contain a considerable supply of oil admitted thereto by a means which I will hereinafter describe in detail. The top of the well is provided with an upright pipe 8 on the upper end of which is mounted a horizontal pipe 9 projecting backwardly through the dashboard 10 of the car and provided with an indicating dial 11. A rod 12 is arranged in the pipe 9 and carries an indicating hand 13 and a pinion 14. A rack bar 15 is arranged in the pipe 8 meshing with the teeth of the pinion 14 and held in engagement therewith by a pin 16. The rack bar extends down through the pipe 8 and is provided at its lower end with a float 17 which rides on the body of oil in the well 6 and moves up and down therewith.

The level of the oil in the well 6 being the same as that in the crank case, it is evident that the operator of the car can, at a glance, determine the quantity of oil in the case and whether there is sufficient amount for proper lubrication. The oil in the case will be thrown against the walls thereof as the crank revolves and if the float depended within the case proper, its fluctuations would be so frequent and extreme that it would be difficult for the driver of the car to ascertain with any degree of certainty, how much oil was contained in the case. By providing a well at one side of the casing, I avoid this difficulty, as a comparatively still body of oil will be contained therein and will maintain its level in the case and being slowly fed through the port 7 to the case will be more uniform in its level and will support the float with less fluctuation.

To avoid the use of the gravity sight feed, usually employed and generally found to be unreliable, I provide a pipe 18 connecting with the upper portion of the well 6 and leading to an oil tank 19. Check valves 20 and 21 are provided in the pipe 18 and a pump 22 is interposed between the valves 20 and 21, having its plunger 23 within convenient reach of the driver and adapted to be operated to force a supply of oil from the tank 19 into the well 6. This will be done whenever the operator of the car discovers that the float has fallen to a point in the well where it indicates that there is insufficient oil in the crank case to insure proper lubrication. It will then only take a few moments of time to force a quantity of the oil from the supply tank into the well and renew the supply in the crank case.

I do not wish in this application to be confined to the precise mechanism employed for carrying out my invention as I am aware that it is capable of various modifications without departing from the spirit of my invention.

I claim as my invention:

1. The combination, with a motor driven vehicle having a crank case adapted to contain a supply of oil, of an indicator hand and dial, means for forcing oil into said crank case, a float arranged within said crank case and means operatively connecting said indicator hand with said float.

2. The combination, with a motor driven vehicle having a crank case adapted to contain a quantity of oil and a well communicating with said crank case, a float arranged in said well, an indicator hand and dial mounted on the vehicle dashboard and means operatively connecting said indicator hand with said float.

3. The combination, with a motor driven vehicle having a crank case and a well communicating therewith and adapted to contain a supply of oil, the oil in said well flowing into said crank case until the oil in said case and well is on the same level, a float arranged in said well, an indicator hand and dial, means operatively connecting said indicator hand with said float, and an oil force feed device connected with said well.

4. The combination, with a motor driven vehicle having a crank case adapted to contain a supply of oil, of means located near the driver's seat for supplying oil to said crank case, and an indicating device, including a float, adapted to rise and fall with the level of the oil in said case and having a suitable indicating means connected therewith.

5. The combination with a motor driven vehicle, of a gas engine having a crank case, a well adapted to contain a supply of oil and communicating with said crank case, a float provided in said well, an indicator hand and dial operatively connected with said float, a pipe leading into the upper portion of said well and extending backwardly therefrom, an oil supply tank communicating with said pipe and a pump having suitable check valves inserted into said pipe and within convenient reach of the driver of the car, for the purpose specified.

6. The combination, with a motor driven vehicle having an engine and crank case adapted to contain a supply of oil, of means for indicating the height of the oil in said case, an oil supply tank having a pipe connection with said case, and a pump having suitable check valves and located near the driver's seat and adapted to force oil from said tank into said case, for the purpose specified.

In witness whereof, I have hereunto set my hand this 2nd day of April 1910.

EDMUND E. HANS.

Witnesses:
L. C. CRONEN,
J. A. BYRNES.